United States Patent
Smith

(10) Patent No.: US 6,949,187 B2
(45) Date of Patent: Sep. 27, 2005

(54) WASTEWATER TREATMENT APPARATUS AND SYSTEM

(76) Inventor: Danny R. Smith, 2252 N. Poca River Rd., Poca, WV (US) 25159

( * ) Notice: Subject to any disclaimer, the term of this patent is extended or adjusted under 35 U.S.C. 154(b) by 175 days.

(21) Appl. No.: 10/463,041

(22) Filed: Jun. 17, 2003

(65) Prior Publication Data

US 2004/0256316 A1 Dec. 23, 2004

(51) Int. Cl.$^7$ ................................................. C02F 3/00
(52) U.S. Cl. .................... 210/207; 210/220; 210/532.2
(58) Field of Search ............................... 210/205, 206, 210/207, 220, 532.2

(56) References Cited

U.S. PATENT DOCUMENTS

| | | | |
|---|---|---|---|
| 1,734,011 A | | 10/1929 | Harrison |
| 3,662,890 A | | 5/1972 | Grimshaw |
| 3,907,672 A | | 9/1975 | Milne |
| 3,957,633 A | | 5/1976 | Gatti |
| 4,002,561 A | | 1/1977 | Traverse |
| 4,160,723 A | | 7/1979 | Kovacs |
| 4,309,285 A | | 1/1982 | Gallaher, Sr. |
| 4,396,507 A | | 8/1983 | Grant |
| 4,650,577 A | | 3/1987 | Hansel |
| 4,664,795 A | | 5/1987 | Stegall |
| 4,681,684 A | * | 7/1987 | Maroschak et al. ...... 210/532.2 |
| 4,806,241 A | | 2/1989 | Holien |
| 5,061,369 A | * | 10/1991 | Romero et al. ............. 210/170 |
| 5,314,622 A | | 5/1994 | Stirling |
| 5,413,706 A | | 5/1995 | Graves |
| 5,588,490 A | | 12/1996 | Suthersan et al. |
| 5,609,754 A | | 3/1997 | Stuth |
| 5,746,912 A | * | 5/1998 | Monteith ..................... 210/170 |
| 5,785,854 A | | 7/1998 | McKinney |
| 5,792,355 A | | 8/1998 | Desjardins |
| 5,874,002 A | | 2/1999 | Cormier |
| 5,904,847 A | | 5/1999 | Bovington |
| 5,980,739 A | | 11/1999 | Jowett |
| 6,013,120 A | | 1/2000 | Gohara |
| 6,136,190 A | | 10/2000 | Zoeller |
| 6,177,004 B1 | | 1/2001 | Bracone, Jr. |
| 6,228,258 B1 | | 5/2001 | Donald |
| 6,267,882 B1 | | 7/2001 | Houck |
| 6,306,304 B1 | | 10/2001 | Sweet |
| 6,338,797 B1 | | 1/2002 | Nurse, Jr. |
| 6,406,619 B1 | * | 6/2002 | Donald et al. ............... 210/151 |
| 6,495,040 B1 | | 12/2002 | Zoeller |

* cited by examiner

*Primary Examiner*—Chester T. Barry
(74) *Attorney, Agent, or Firm*—John J. Giblin, Jr.; Anthony P. Tokarz; Bowles Rice McDavid Graff & Love LLP

(57) ABSTRACT

An apparatus and system are disclosed for retrofitting a septic tank from a failed residential wastewater treatment system to permit discharge to a surface water body rather than an underground drainage field. The apparatus is a chlorinating tank, comprised of a tank having an inlet and outlet pipe. An inlet diffuser and an outlet diffuser are posited within the chlorinating tank, the inlet diffuser is in hydraulic communication with the inlet pipe, and the outlet diffuser is in hydraulic communication with the outlet pipe. A filter is posited in the outlet diffuser for filtering any remaining solids in the treated wastewater. A chlorinating device is posited downstream of the filter within the chlorinating tank, for adding dissolved chlorine to the chlorinating tank volume.

The system for treating domestic wastewater utilizing a failed septic system is comprised of a source of pressurized air, a sparger for sparging the pressurized air into the waste water contents of the septic tank, a chlorinating tank, comprised of means for mixing the partially treated wastewater, a filter and a chlorinating device, and a vent line for routing and treating noxious vent gases from the septic tank into the chlorinating tank. A discharge pipe is further provided for discharging the treated wastewater from the chlorinating tank to a surface waterway.

16 Claims, 2 Drawing Sheets

WASTEWATER TREATMENT APPARATUS AND SYSTEM

BACKGROUND OF THE INVENTION

1. Field of the Invention

The invention disclosed herein relates to an apparatus, system and method for treating domestic wastewater and sewage.

2. Description of Prior Art

Residential dwellings are constructed with various systems to be fit for human habitation, including some means for disposing of sewage and wastewater produced by the dwelling's inhabitants. Dwellings located in urban or municipal areas are usually connected to a network of sewer pipelines, which route wastes to a central treatment works. Dwellings in rural areas, on the other hand, usually have some form of partial or full treatment system located on site. These on-site treatment systems include anaerobic treatment systems, such as cesspools or septic tanks, and aerobic systems, such as aerated treatment tanks.

Anaerobic treatment systems treat domestic waste and waste water using anaerobic, or "without oxygen" bacteria. The septic tanks used in such systems are simple, comprised of a subsurface concrete or steel tank, an inlet pipe for charging waste into the tank, and an outlet pipe. In the tank the waste resides for a length of time, during which it separates into sludge, liquid and scum layers. The sludge layer, which settles and accumulates on the bottom of the tank, contains most of the pollutants and solids in the domestic waste and is gradually degraded by anaerobic bacteria. After the solids settle from the liquid, the liquid layer is discharged from the septic tank through the outlet, usually through some form of baffle to prevent the discharge of any floating scum or settled sludge, as well.

The separation and anaerobic degradation of the solids is, however, slow and inefficient. As a result, the liquid effluent from the outlet of a septic tank still contains dissolved and suspended pollutants, odors and possible pathogens, and is not suitable to discharge to a surface waterway. Typically, the effluent from a septic tank is discharged to a drainage field or leach field, consisting of one or more parallel trenches with subsurface perforated pipes. The effluent is discharged through the perforations, from where it leaches into the subsoil and is further decomposed and degraded by soil bacteria prior to merging with the local groundwater table.

Aerobic systems, on the other hand, utilize aerobic, or "with oxygen" bacteria, which are more effective than anaerobic bacteria. An aerobic treatment system usually consists of two tanks or chambers; the first in which waste is mixed into a slurry with entrained and dissolved air, which promotes the growth and activity of aerobic bacteria. Air is introduced into the waste slurry in the mixing chamber either by an air sparger, which is a pipe with one or more openings placed below the slurry level, through which pressurized air is injected into the slurry, or by a diffuser, similar to an agitator or propeller, which rotates in the waste slurry and draws air from the vapor space above the slurry down into its blades and mixes with the slurry.

After a sufficient average residence time in the mixing chamber, the waste slurry flows into the second, settling chamber, where the solids settle into a sludge layer on the bottom of the chamber. The clarified liquid is discharged from the settling chamber, usually through a baffle to prevent discharge of any floating waste material. Because of the greater efficiency of aerobic bacteria, the effluent from an aerobic system is usually treated sufficiently for discharge to a surface water body, such as a stream, except for some quantity of residual bacteria, which are easily treated with a final chlorination step. For this, a chlorinating device is positioned in the effluent of the aerobic system, either within the settling chamber or as a separate chamber adjacent to the settling chamber.

As described above, a septic system includes a drainage field, where the remainder of the necessary treatment on the waste water occurs. However, this subsoil treatment encourages and promotes the growth of bacteria in the subsoil, which over time results in a slime filling and blocking the pores and interstitial spaces of the subsoil. When this occurs, the subsoil is no longer permeable and the septic system can no longer function properly. In this event, either a new drainage field must be installed down grade of the septic tank, or, if no suitable soil is available for a new drainage field, the entire system must be replaced with an aerobic system.

The latter scenario has become common in rural areas such as in the Appalachian region. Many properties in rural Appalachia have shallow, clay soils with limited permeability. These properties are often located adjacent or near to small surface water bodies. As the drainage fields in existing septic systems fail, the lack of suitable soil and more stringent water pollution control regulations proscribe the installation of another drainage field.

In many of these situations, the only alternative available is the installation of an aerobic treatment system, due to the ability of an aerobic system to discharge to surface waters and the availability of potential receiving water bodies in the Appalachian region. However, at present, a switch to an aerobic treatment system requires the installation of a complete, new system and abandonment of the septic tank as well as the drainage field of the failed anaerobic system. In abandoning the septic tank, a valuable piece of equipment is lost which is capable of functioning as part of an aerobic system through a retrofit or conversion, that could thereby reduce the cost of the new system installation.

SUMMARY OF THE INVENTION

The present invention provides for retrofitting and converting an existing septic treatment tank from a failed anaerobic treatment system to an aerobic system, suitable for discharging treated domestic wastewater directly to a surface water body, by adding means to the treatment tank for incorporating air into the waste water, and providing an additional tank for chlorinating the effluent from the converted tank and treating the vapor emissions from the converted treatment tank.

The existing septic tank is retrofitted by installing a source for introducing air into the waste volume within the septic tank, and a vent line for collecting and routing gases containing obnoxious odors from the septic tank to a chlorination tank, described below. The source of air for introduction into the waste may be comprised of an air blower or compressor, which pumps air through a pipeline into the waste slurry in the septic tank.

A chlorinating tank is provided for receiving and treating the clear liquid discharged from the retrofitted septic tank. Within the chlorinating tank are two vertical sections of perforated pipe, one of which is connected to an inlet port and the other to the outlet port of the chlorinating tank. The perforations are to promote mixing of the inflowing wastewater with the tank contents. A chlorinating device is positioned in the outlet line, which functions to dissolve chlorine into the effluent wastewater, thereby destroying any residual microbes. A bleed hole is positioned in the outlet line, after the chlorinating device, to recycle chlorine into the volume of the chlorinating tank.

A filter is also positioned in the chlorinating tank, positioned in the vertical section of the outlet pipe, above the perforations. The filter removes any residual suspended solids in the wastewater prior to discharge to the environment. A long vertical rod is connected to the filter, which passes vertically up through a filter service pipe which is registered with the outlet pipe and extends above the soil service. The filter is removed and replaced using the vertical rod to move the filter through the filter service pipe.

DETAILED DESCRIPTION

Figure 1:
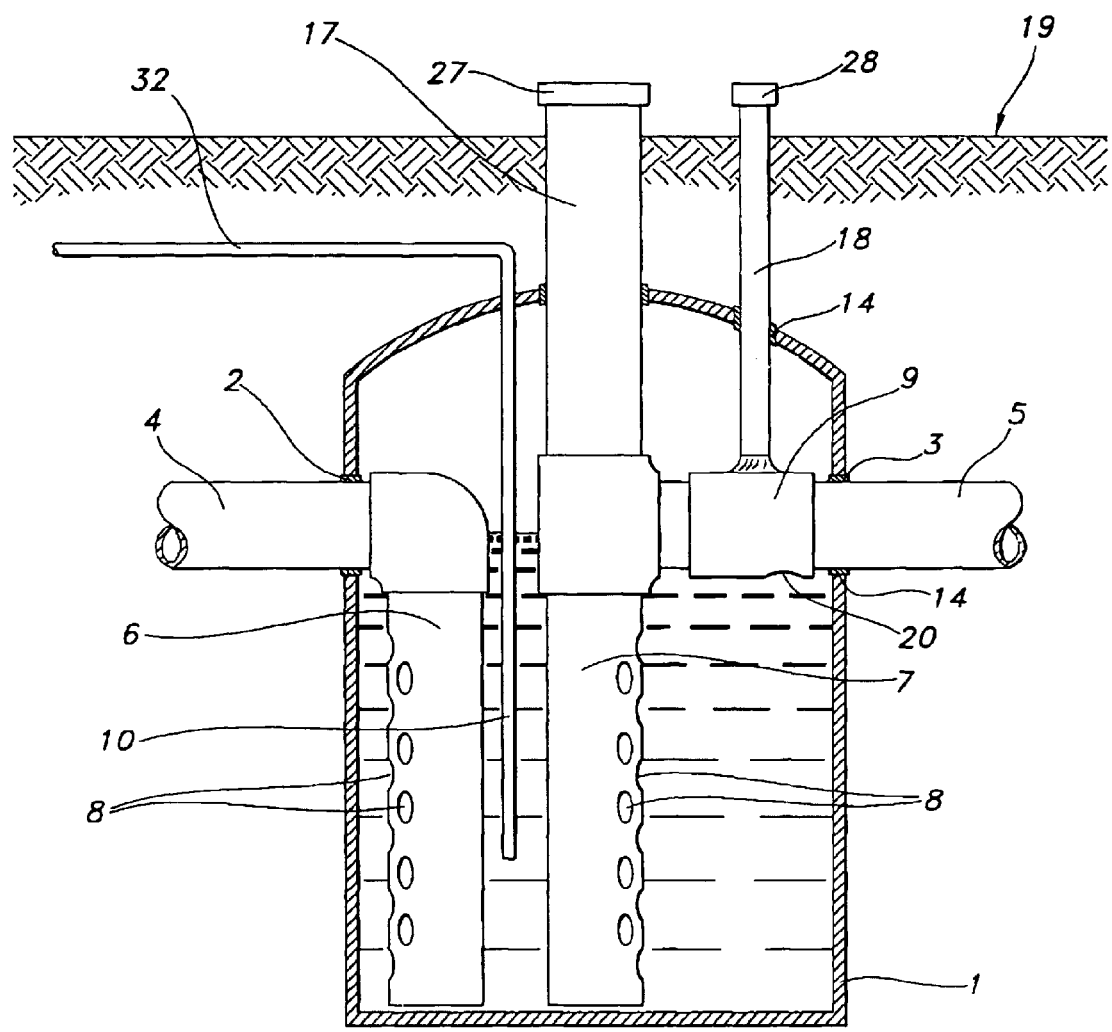
FIG. 1 is an elevation view of the chlorinating tanks, with a section of the chlorinating tank removed showing the various internal elements of the chlorinating tank.

As shown in FIG. 1, the invention disclosed herein comprises a chlorinating treatment tank for further treating domestic wastewater is disclosed. The chlorinating treatment tank is comprised of a tank 1, with cylindrical vertical sides, a closed bottom and a closed top. In the preferred embodiment, the tank is comprised of a 55-gallon polyethylene drum, fabricated with side and bottom as a single unit, and having a removable top held in place by a lever clamp.

Disposed within the side of the tank 1 are an inlet port 2 and an outlet port 3. These ports 2, 3 may be holes or apertures cut or bored into the tank side. The two ports 2, 3 are disposed opposite each other and at the same level in the side of the tank 1. The ports 2, 3 are posited proximate the top edge of the tank 1, without denigrating the mechanical integrity of the tank 1.

Registering with the inlet port 2 and outlet port 3 are an effluent inlet pipe 4 and an effluent outlet pipe 5, respectively. Elastomeric sealing rings 14 are disposed circumferentially around the effluent inlet and outlet pipe, for sealing the annular cavity between the outer circumference of the effluent pipes 4, 5 and the edges of the ports 2, 3. The diameter of the port is sized accordingly to effectuate a watertight seal when the selected seal is installed. Preferably, the elastomeric seal has a cross section with a flat inner surface to seal against the outer surface of the effluent pipe, and a grooved outer surface for sealing around the edge of the port 2, 3.

Disposed within the interior of the tank 1 is a vertical inlet diffuser 6. The inlet diffuser is a hollow pipe, preferably made of schedule 40 polyvinyl chloride. The inlet diffuser 6 is in hydraulic communication with the effluent inlet pipe 4 by, for example, an elbow fitting, and has a closed bottom. The inlet diffuser 4 is posited proximate to the interior side wall of the tank 1 and has at least one, preferably three, columns of holes or apertures 8 bored in its vertical side. These columns of apertures 8 are posited in a cylindrical quadrant centered adjacent to the interior wall of the tank 1. These apertures facilitate mixing of the influx with the contents of the tank under laminar conditions.

Also disposed within the tank 1 is a vertical outlet diffuser 7, being made of hollow pipe, preferably schedule 40 polyvinyl chloride. The outlet diffuser is in hydraulic communication with the outlet effluent pipe, and has a closed bottom. The outlet diffuser 7 is posited at or proximate to the center vertical axis of the tank 1. The outlet diffuser has one or more columns of apertures 8 bored in its vertical side. These columns are posited in the cylindrical quadrant centered opposite from the inlet diffuser.

Preferably, the hydraulic communication between the outlet diffuse and the outlet effluent pipe 5 is by a tee-fitting, registered with the base of the tee connected to the outlet effluent pipe 5 and the outlet diffuser registered with the lower arm of the tee fitting. An access pipe 17 is registered with the upper arm of the tee fitting, coaxial with the outlet diffuser. The access pipe extends through the top of the tank 1 and above the ground surface 19 and is enclosed by a cap 27. Located in-line in that section of the effluent outlet line 5 between the base of the elbow fitting and the outlet port is a chlorinating device 9. Inside the chlorinating device, chlorine is added to the effluent prior to discharge from the tank, so as to disinfect and deodorized the effluent wastewater. A weep hole 20 is posited on the bottom of the chlorinating device 9 to allow chlorinated wastewater to recycle back into the tank volume. A chlorine addition tube 18 extends from the top of the chlorinating device 9, through the top of the tank 1 and extends above the ground surface 19. A cap 28 seals the top of the addition tube 18.

Figure 2:
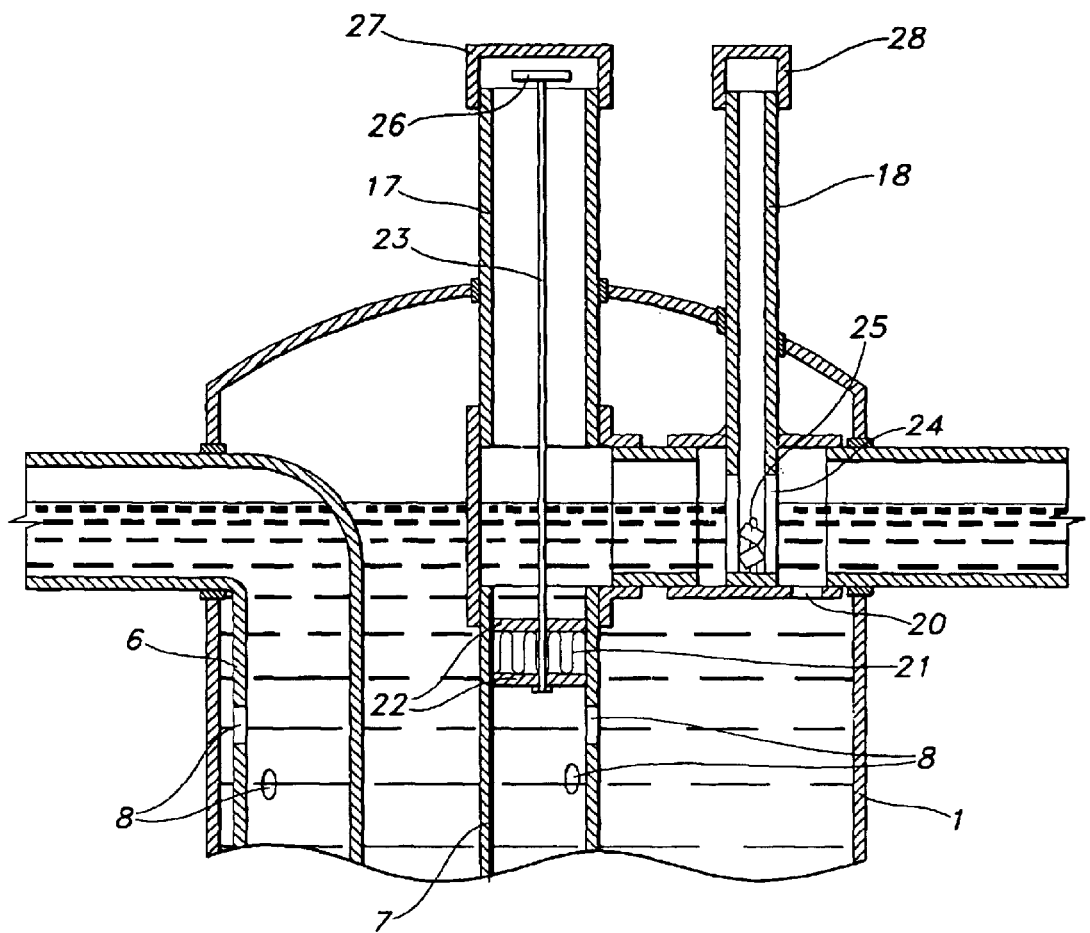
FIG. 2 is an elevation sectional view of the outlet pipe and chlorinating device in the chlorinator tank.

As shown in FIG. 2, posited inside the outlet diffuser 7 is a filter 21. The filter removes any remaining suspended solids from effluent wastewater prior to discharge from the tank 1. The filter is fabricated from felted, chopped or spun fiberglass, or from other filter media commonly available in the art. The filter is held in place between two perforated support plates 22, which seal against the interior wall of the outlet diffuser 7. Holes are disposed in the center of each support plate 22, through which pass a filter rod 23. The support plates are rigidly and removably fixed to the filter rod. The filter rod extends from the filter and its support plates, up through the tee fitting to the top of the access pipe 17. A handle 27 may be attached to the top of the filter rod 23 to facilitate manual grasping. In operation, an exhausted filter is removed from the outlet diffuser 7 by extracting vertically with the filter rod 23. The exhausted filter 21 is removed from between the two support plates 22 and fresh filter material is added. The filter is then redisposed into the outlet diffuser by sliding down the interior of the access pipe 17.

As also shown in FIG. 2, the chlorine addition tube extends within the chlorinating device 9. A plurality of slots 24 preferably ⅛ inch wide, is disposed at the bottom of the chlorine addition tube, within the interior of the chlorinating device 9. The slots 24 effectuate mixing of wastewater with chlorine tablets 25 in the interior of the chlorine addition tube 18. Chlorine tablets 25 are inserted into the chlorinating device 9 by removing the cap 28 and dropping the chlorine tablets down the addition tube 18.

Figure 3:
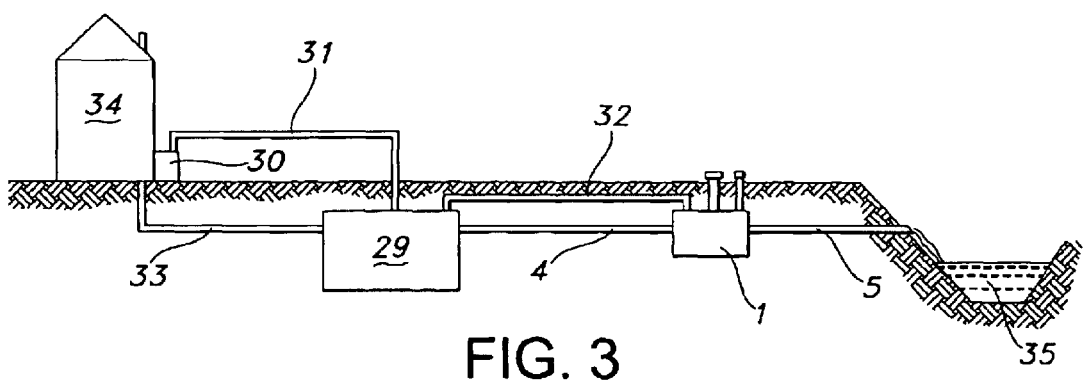
FIG. 3 is a diagram of the retrofitted wastewater treatment system.

As shown in FIG. 3, the chlorinating tank facilitate in the retrofit of a failed septic treatment system. The septic tank 29, formerly used in the failed treatment system, receives domestic sewage and wastewater through a waste line 33 from a domestic residence. 34. A source of pressurized air 30, such as an air compressor, blower, or one or more bottles or tanks of compressed air, provides air through an air line 31 into the septic tank 29. The end of the air line 31 is submerged under the wastewater level in the septic 29. In the preferred embodiment, the pressurized air source 30 is provided with a timer to pulse airflow to the septic tank at regular intervals. The addition of air through the air line 31 to the septic tank 29 promotes growth of aerobic bacteria and enhances waste treatment in the septic tank 29. The air and gases which accumulate in the septic tank 29 are then vented through the vent line 32 and into chlorination tank 1. The gases are sparged into the liquid contents in the chlorination tank 1 through a submerged sparger 10. Sparging the vent gases from the septic tank into the chlorinated contents of the chlorinator tank 1 removes the noxious constituents of the vent gases.

The effluent from the septic tank 29 is transported through the effluent inlet pipe 4 and into the inlet diffuser 6. The effluent wastewater passes through the plurality of apertures 8 and mixes with the tank volume. Treated effluent wastewater passes through the apertures 8 of the outlet diffuser 7, up through the outlet diffuser 7, and through the filter 21, where any residual solids are removed. The effluent wastewater passes through the chlorinating device, where a chlorine-containing disinfecting solid, such as calcium hypochlorite, is present, some of which dissolves, providing chlorine in the wastewater to disinfect any pathogens present. Some of the chlorinated effluent recycles back into the tank volume by passing through the weep hole 20. The remaining chlorinated effluent travels through the effluent outlet pipe 5 and is discharged to a stream 35 or other surface water body.

I claim:

1. A wastewater treatment apparatus, for treating effluent from a septic treatment tank suitable for discharging to surface waters, comprising:
   a. a tank, having vertical walls, a closed top and a closed bottom, and an inlet pipe and an outlet pipe disposed through ports in said vertical walls;
   b. an inlet diffuser, disposed within the tank, having a vertical section which is in hydraulic communication with the inlet pipe, having a closed bottom, and having disposed within its walls a plurality of apertures;
   c. an outlet diffuser, disposed within the tank, having a vertical section which is in hydraulic communication with the outlet pipe, having a closed bottom, and having disposed in its walls a plurality of apertures; and
   d. a chlorination device disposed within the tank.

2. The apparatus of claim 1, wherein the chlorination device is disposed in the outlet pipe between the outlet diffuser and the outlet port, and further comprising at least one aperture in the lower cylindrical half of the outlet pipe between the chlorination device and the outlet port.

3. The apparatus of claim 1, wherein the inlet diffuser is disposed proximate to the interior wall of the tank and the apertures in the inlet diffuser are disposed in at least one column within the cylindrical quadrant of the vertical section of the inlet pipe the center of said quadrant disposed adjacent the interior wall of the tank.

4. The apparatus of claim 1, wherein the outlet diffuser is aligned coaxially with the center axis of the tank and the apertures are disposed in at least one column within the cylindrical quadrant of the vertical section of the outlet diffuser, the centerline of said quadrant disposed directly opposite the vertical section of the inlet diffuser.

5. The apparatus of claim 1, wherein the chlorination device is disposed between the inlet port and the inlet diffuser.

6. The apparatus of claim 1, further comprising a chlorine addition tube having a lower end in communication with the chlorination device, passing through the closed top of the tank, and having an upper end disposed above the top of the tank, for providing the means for adding chlorine tablets to the chlorination device.

7. The apparatus of claim 1, further comprising a filter disposed within the outlet diffuser.

8. The apparatus of claim 7, further comprising a vertical hollow filter removal tube in communication with the outlet diffuser and extending through and beyond the closed top of the tank, and further comprising a removal apparatus disposed within the interior of the filter removal tube for removing and replacing the filter.

9. A wastewater treatment system, comprised of:
   a. A septic treatment tank, for treating domestic wastewater, having a wastewater layer, a vapor space and an effluent outlet;
   b. A source of pressurized air;
   c. An air sparger connected from the source of pressurized air to the septic treatment tank, wherein the end of the air sparger is submerged under the wastewater layer of the septic treatment tank; and
   d. A wastewater treatment device, for treating effluent from a septic treatment tank suitable for discharging to surface waters, comprising:
      i. a tank, having vertical walls, a closed top and a closed bottom, and an inlet pipe and an outlet pipe disposed through ports in said vertical walls, for receiving and treating domestic wastewater;
      ii. An inlet diffuser, disposed within the tank, in hydraulic communication with the inlet pipe, having a closed bottom, and having disposed within its walls a plurality of apertures;
      iii. An outlet diffuser, disposed within the tank in hydraulic communication with the outlet pipe, having a closed bottom, and having disposed in its walls a plurality of apertures; and
      iv. a chlorination device disposed within the tank.

10. The system of claim 9, wherein the chlorination device disposed between the outlet diffuser and the outlet port, and further having at least one aperture in the lower cylindrical half of the pipe between the chlorination device and the outlet port for recycling chlorinated wastewater into the tank volume.

11. The system of claim 9, wherein the chlorination device is disposed in the inlet pipe between the inlet port and the inlet diffuser.

12. The system of claim 9, wherein the inlet diffuser is disposed proximate to the interior wall of the tank and the apertures in the inlet diffuser are disposed in at least one column within the cylindrical quadrant of the inlet diffuser directly adjacent the interior wall of the tank.

13. The system of claim 9, wherein the outlet diffuser is aligned coaxially with the center axis of the tank and the apertures in the outlet diffuser are disposed in at least one column within the cylindrical quadrant of the outlet diffuser directly opposite the inlet diffuser.

14. The system of claim 9, wherein the source of pressurized air is an air compressor, a blower, or at least one compressed air storage tank.

15. The system of claim 9, further comprising a filter disposed within the outlet diffuser.

16. The system of claim 15, wherein the filter is disposed in the outlet diffuser, further comprising a vertical hollow filter removal tube in communication with the vertical section of the outlet diffuser and extending beyond the upper surface of the tank, and further comprising a removal apparatus disposed within the interior of the filter removal tube for removing and replacing the filter.

* * * * *